US012692011B2

(12) United States Patent
Bourne et al.

(10) Patent No.: US 12,692,011 B2
(45) Date of Patent: Jul. 28, 2026

(54) EMBEDDED THERMAL SENSING WITHIN ELECTRICAL POWER HARNESS

(71) Applicant: Lockheed Martin Corporation, Bethesda, MD (US)

(72) Inventors: Frederick L. Bourne, Litchfield, CT (US); Bernard J. Andrews, Shelton, CT (US); Mark P. Eisenhauer, Stratford, CT (US); Hans R. Massaquoi, Stratford, CT (US); Carlo Asaro, Stratford, CT (US); Elvis Arturo Crespo, Stratford, CT (US); Timothy R. Budd, Stratford, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 180 days.

(21) Appl. No.: 18/359,676

(22) Filed: Jul. 26, 2023

(65) Prior Publication Data

US 2025/0033790 A1 Jan. 30, 2025

(51) Int. Cl.
| | |
|---|---|
| B64D 41/00 | (2006.01) |
| G01K 3/00 | (2006.01) |
| B64C 27/04 | (2006.01) |
| B64D 15/12 | (2006.01) |

(52) U.S. Cl.
CPC ............. B64D 41/00 (2013.01); G01K 3/005 (2013.01); *B64C 27/04* (2013.01); *B64D 15/12* (2013.01)

(58) Field of Classification Search
None
See application file for complete search history.

(56) References Cited

U.S. PATENT DOCUMENTS

| | | | |
|---|---|---|---|
| 2007/0259545 A1* | 11/2007 | Berenger | .................. H02J 4/00 439/135 |
| 2007/0284363 A1 | 12/2007 | Kim | |
| 2015/0344138 A1 | 12/2015 | Wen et al. | |
| 2019/0084682 A1* | 3/2019 | Aubert | .................. B64D 15/22 |

(Continued)

FOREIGN PATENT DOCUMENTS

| | | |
|---|---|---|
| CN | 207328848 U | 5/2018 |
| CN | 110861771 A | 3/2020 |

(Continued)

OTHER PUBLICATIONS

Extended European Search Report for Application No. 24189191.0 dated Nov. 6, 2024 (13 pages).

(Continued)

*Primary Examiner* — Phutthiwat Wongwian
*Assistant Examiner* — Jacek Lisowski
(74) *Attorney, Agent, or Firm* — Michael Best & Friedrich LLP

(57) ABSTRACT

Systems and methods for an overheating control system for an electrical power harness disposed within an enclosure of an aircraft. The system includes a temperature sensor disposed within the enclosure and communicatively coupled to an electronic processor. The electronic processor is configured to monitor, via the temperature sensor, a temperature within the enclosure, compare the temperature to a predetermined threshold, and adjust a power output provided to one or more supply lines of the harness based on an amount in which the temperature exceeds the predetermined threshold.

15 Claims, 4 Drawing Sheets

(56) References Cited

U.S. PATENT DOCUMENTS

| | | | |
|---|---|---|---|
| 2019/0383382 A1* | 12/2019 | Brodnicki | F16H 57/0449 |
| 2020/0156774 A1* | 5/2020 | Tucker | B64C 27/12 |
| 2020/0168363 A1 | 5/2020 | Studer et al. | |
| 2022/0307910 A1 | 9/2022 | Fulcher et al. | |
| 2022/0371577 A1* | 11/2022 | Narita | B60W 10/30 |

FOREIGN PATENT DOCUMENTS

| | | |
|---|---|---|
| EP | 3954573 A1 | 2/2022 |
| KR | 2011124542 A | 11/2011 |
| TR | 2022011942 A2 | 8/2022 |

OTHER PUBLICATIONS

European Patent Office Action for Application No. 24189191.0 dated Dec. 3, 2025 (9 pages).

* cited by examiner

EMBEDDED THERMAL SENSING WITHIN ELECTRICAL POWER HARNESS

FIELD OF INVENTION

Embodiments described herein relate to aircraft electrical systems and, in particular, to systems and methods for thermal regulation of high-power supply lines.

SUMMARY

Some electrical systems of a vehicle (such as, for example, rotary-type aircraft) may call for power supply wires to run throughout areas within the vehicle that may be exposed to heat during operation of the vehicle due to surrounding components including the power supply wires themselves. Certain high temperatures may result in a breakdown of electrical insulation of the wires. While several cooling solutions may exist, in some instances, the space in which the supply wires are run through may be compact in size. Thus, heat dissipation solutions to detect and mitigate the heat, such as, for example, installation of a heat sink, a ventilation system, etc., may not be feasible in such circumstances. These types of systems also add weight to an aircraft, which impact aircraft performance.

To address these and other issues, embodiments described herein use an embedded sensor within a wire harness bundle to provide feedback thermal sensing and power control capability. For example, embodiments described herein provide an overheating control system for an electrical power harness disposed within a confined enclosure, such as, for example, within an aircraft and, in particular, a rotor shaft of an aircraft. One system includes a temperature sensor disposed within the enclosure and communicatively coupled to an electronic processor. The electronic processor is configured to monitor, via the temperature sensor, a temperature within the enclosure, compare the temperature to a predetermined threshold, and adjust a power output provided to one or more supply lines of the harness based on, for example, an amount in which the temperature exceeds the predetermined threshold.

Other embodiments described herein provide a method for providing overheating control for an electrical power harness disposed within a confined enclosure, such as, for example, an enclosure of an aircraft. The method includes monitoring, via a temperature sensor, a temperature within the enclosure, comparing the temperature to a predetermined threshold, and adjusting a power output provided to one or more supply lines of the harness based on an amount in which the temperature exceeds the predetermined threshold.

Other aspects will become apparent by consideration of the detailed description and accompanying drawings.

DETAILED DESCRIPTION

Figure 1:
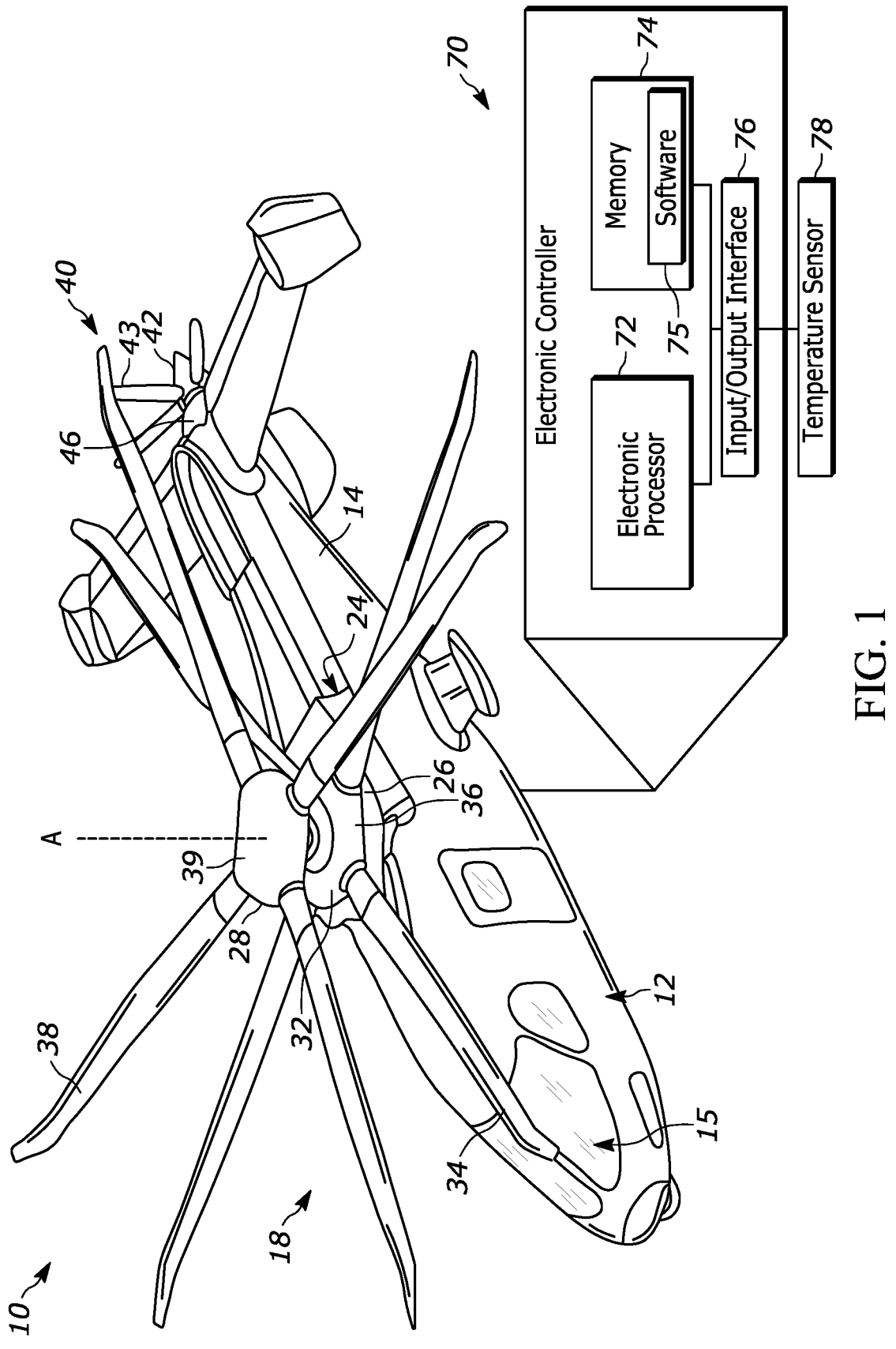
FIG. 1 depicts a rotary wing aircraft according to an exemplary embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. For example, although the examples described herein are in regard to a rotary wing aircraft, the systems and methods described herein may also be applied to other kinds of land-based and/or non-land based vehicles.

For ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

It should also be noted that a plurality of hardware and software-based devices, as well as a plurality of different structural components may be utilized to implement the embodiments provided herein. It should also be noted that a plurality of hardware and software-based devices, as well as a plurality of different structural components may be used to implement the invention. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software-based devices, as well as a plurality of different structural components may be utilized to implement the invention. For example, "control units" and "controllers" described in the specification can include one or more processors, one or more application specific integrated circuits (ASICs), one or more memory modules including non-transitory computer-readable media, one or more input-output interfaces, and various connections (e.g., a system bus) connecting the components.

It will be appreciated that some embodiments may be comprised of one or more electronic processors such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, some embodiments may be implemented as a computer-readable storage medium having computer readable code stored thereon for programming a computer (e.g., comprising an electronic processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be understood that although certain drawings illustrate hardware and software located within particular devices, these depictions are for illustrative purposes only. In some examples, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among multiple different devices. Accordingly, in the claims, if an apparatus, method, or system is claimed, for example, as including a controller, control unit, electronic processor, computing device, logic element, module, or other element configured in a certain manner, for example, to perform multiple functions, the claim or claim element should be interpreted as meaning one or more of such elements where any one of the one or more elements is configured as claimed, for example, to make any one or more of the recited multiple functions, such that the multiple elements, as a set in a collective nature, perform the multiple functions.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. The term "predetermined" means specified prior to an event. Also, electronic communications and notifications may be performed using any known means including direct connections (e.g., wired or optical), wireless connections, or other communication.

Referring now to the figures, FIG. 1 illustrates a co-axial rotary wing aircraft 10 according to some embodiments. The aircraft 10 includes an airframe 12 with an extending tail 14. The aircraft 10 includes a dual, counter rotating, co-axial main rotor assembly 18 that rotates about an axis A. The airframe 12 may include a cockpit 15 that may have one or more seats for flight crew (e.g., pilot and co-pilot) and optional passengers. In some embodiments, the aircraft 10 may be an uncrewed aircraft.

The main rotor assembly 18 is driven by a power source, such as, for example, one or more motors 24 via a main rotor gearbox 26. The one or more motors 24 can include an electric motor, a piston engine, a gas turbine, or other device for providing motion. The main rotor assembly 18 includes an upper rotor assembly 28 driven in a first direction (e.g., counter-clockwise) about the main rotor axis A, and a lower rotor assembly 32 driven in a second direction (e.g., clockwise) about the main rotor axis A, wherein the second direction is opposite to the first direction (i.e., to provide two counter rotating rotors). The upper rotor assembly 28 includes a first plurality of rotor blades 38 supported by a first rotor hub 39. The lower rotor assembly 32 includes a second plurality of rotor blades 34 supported by a second rotor hub 36.

Figure 2:
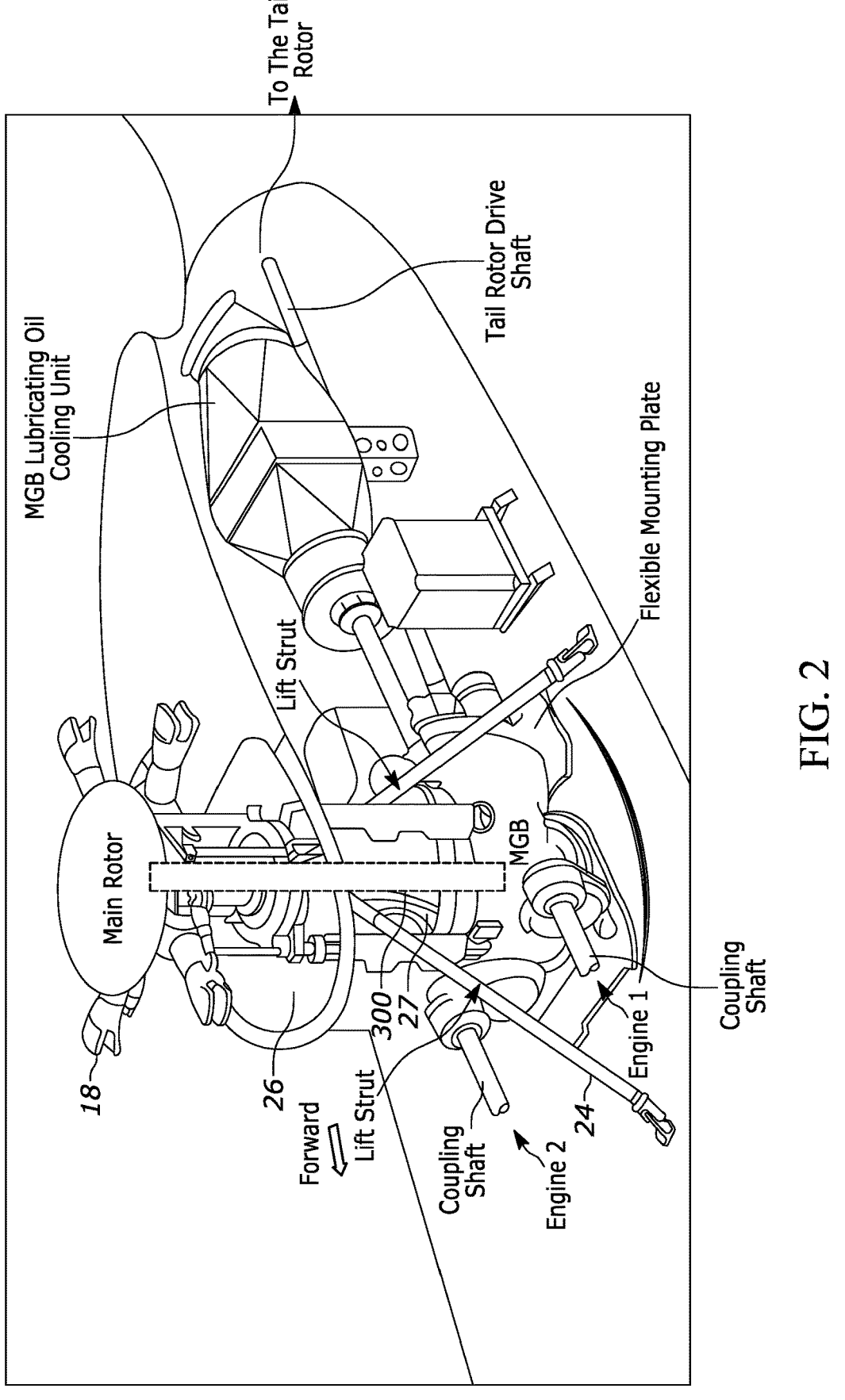
FIG. 2 depicts a main gearbox of the aircraft of FIG. 1.
Figure 3:
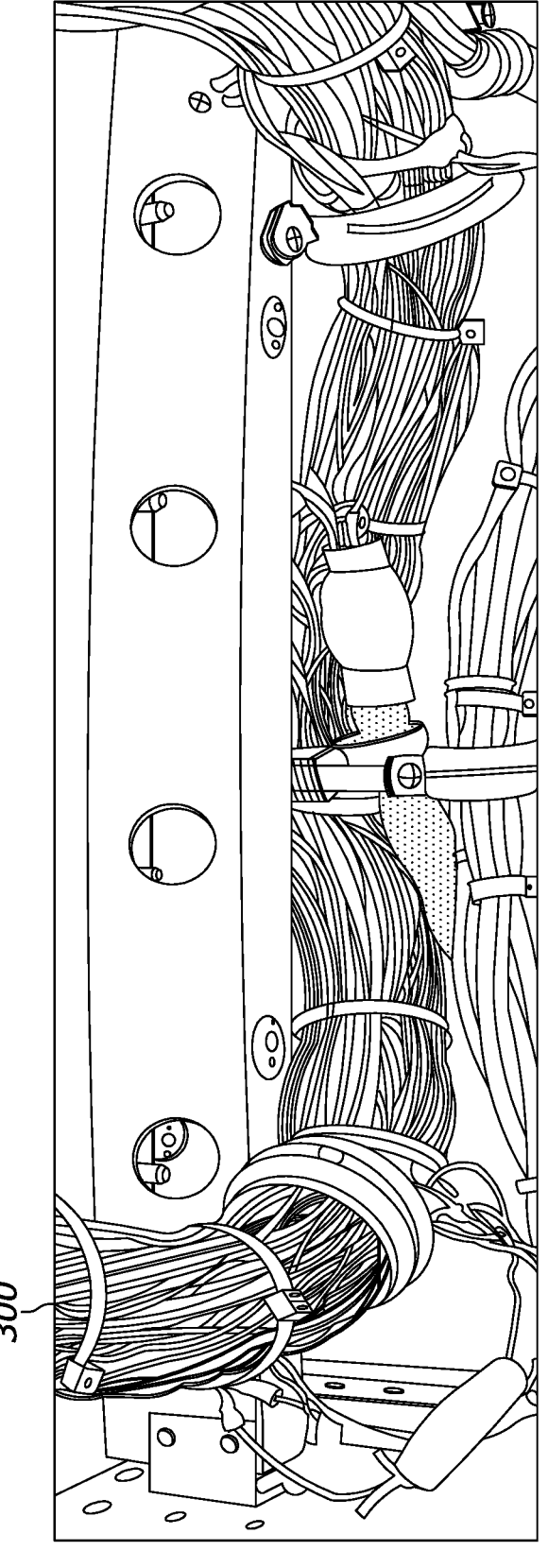
FIG. 3 depicts an electrical harness of the aircraft of FIG. 1.

FIG. 2 illustrates the main rotor gearbox 26 in accordance with some embodiments. The gearbox 26 receives input from the one or more motors 24 to drive the main rotor assembly 18. The main rotor gearbox 26, as illustrated, includes a housing enclosure 27, which houses, among other things, one or more high power supply lines (for example, 270 VDC) to one or more components/subsystems disposed on, within, and/or proximate to the rotor assembly 18 (collectively referred to herein as load 402 with respect to FIG. 4). The enclosure 27 may be a housing of the gearbox 26 itself or an enclosure disposed within a housing of the gearbox 26 (for example, a shaft with a hollow core. A portion of the power supply lines may be bundled and run together through the gearbox 26 within the enclosure 27 as an electrical wire harness 300 (as illustrated in FIG. 3). The enclosure 27 has limited volume and may be constructed or surrounded by metal (e.g., a carbon fiber tube), which may cause the internal temperature of the shaft to reach approximately 100° C. or more when the aircraft 10 is in flight.

Returning to FIG. 1, the aircraft 10 also includes a pusher-propeller 40 located at the extending tail 14 to provide translational thrust (forward or rearward) for the aircraft 10. In some embodiments, the pusher-propeller 40 includes a propeller 42 including a plurality of propeller blades 43. Although FIG. 1 illustrates the propeller 42 in the context of a pusher-propeller configuration, in other embodiments, the propeller 42 may be a puller-propeller. Similarly, in some embodiments, the propeller 42 may be mounted in a static configuration with respect to the aircraft 10 as illustrated in FIG. 1. However, in other embodiments, the propeller 42 has a variable position, which allows the propeller to provide yaw control in addition to translational thrust. Also, in some embodiments, the aircraft 10 includes more than one pusher-propellers, such as, for example, one positioned on the back left of the aircraft 10 and one positioned on the back right of the aircraft 10.

In some embodiments, the pusher-propeller 40 (i.e., the propeller 42) is connected to and driven by the one or more motors 24 via a propeller gearbox 46. In some embodiments, the propeller gearbox 46 is driven by the main rotor gearbox 26, and the propeller gearbox 46 can be configured to change a gear ratio between the main rotor gearbox 26 and the propeller gearbox 46 to vary, on command, the relative speeds between the main rotor gearbox 26 and the propeller gearbox 46. In such embodiments, the variable gear ratio of the propeller gearbox 46 controls power transmitted from the main rotor gearbox 26 to the propeller gearbox 46. Other configurations for controlling the pusher-propeller 40 are possible, such as, for example, using an engine or power source to drive the pusher-propeller 40 that is separate from the engine or power source used to power the main rotary assembly 18.

As also illustrated in FIG. 1 (in an expanded view), the aircraft 10 includes an electronic controller 70. The electronic controller 70 includes electrical and electronic components that provide power, operation control, and protection to the components and modules within the electronic controller 70. The electronic controller 70 includes an electronic processor 72 (such as a programmable electronic microprocessor or similar device) that executes software to control operation of the main rotor assembly 18 and the pusher-propeller 40. In the example illustrated in FIG. 1, the electronic controller 70 also includes memory 74 (for example, non-transitory, machine-readable memory, such as, for example, a hard disk, a CD-ROM, an optical storage device, a magnetic storage device, a ROM, a programmable read-only memory (PROM), an EEPROM, an erasable programmable read-only memory (EPROM), and a Flash memory) and an input-output interface 76.

The electronic processor 72 is communicatively connected to the memory 74 and the input-output interface 76. In some embodiments, the memory 74 stores software 75 executable by the electronic processor 72 to perform the control functionality and associated methods described herein.

The electronic processor 72 is further communicatively coupled to one or more temperature sensing devices (e.g., through the input-output interface 76), which are configured to communicate, to the electronic processor 70, a signal indicative of a temperature at the respective temperature sensing device. The one or more temperature sensing devices are referred to herein as temperature sensors 77. The temperature sensor 77 may be or include one or more of a thermistor type sensor, a thermocouple type sensor, a semiconductor-based sensor, a resistance temperature detector, and the like. The temperature sensor 77, as explained in more detail below, is positioned within the enclosure 27 and is configured to measure a temperature of the environment surrounding the harness 300. In some embodiments, the temperature sensor 77 is self-powered (e.g., with an internal battery or other power source). In other embodiments, the temperature sensor 77 may receive power from one of the electronic processor 72, the supply wires, or another power source. The temperature sensor 77 may also not require any type of excitation current, which may simplify wiring and power management for the control system. It should be understood that, in some embodiments, the electronic processor 72 and the temperature sensor 77 may communicate over a wired connection (e.g., the temperature sensor 77 may provide voltage values translatable by the electronic processor 72 into temperature data), a wireless connection, or a combination thereof.

It should be understood that the electronic controller 70 can include other components, and the configuration illustrated in FIG. 1 is provided as one example. For example, in some embodiments, the electronic controller 70 includes on one or more microprocessors, digital signal processors, customized processors and field programmable gate arrays (FPGAs) and unique stored program instructions (including both software and firmware) that controls the one or more processors to implement, in conjunction with certain non-processor circuits, the functionality described herein or a portion thereof. Alternatively, the functionality described herein, or a portion thereof, could be implemented by a state machine that has no stored program instructions, or in one or more application specific integrated circuits (ASICs), in which functionality is implemented as custom logic. Of course, a combination of the two approaches could be used.

While FIG. 1 provides an example of a rotary wing aircraft, systems described herein may also be utilized in different types of aircrafts (and, as mentioned above, other kinds of vehicle systems). For example, systems described herein may be utilized in a turboprop aircraft, a piston aircraft, a jet, a fixed wing aircraft, a transport aircraft, an unmanned aerial vehicle (UAV), or some other suitable fly-by-wire aircraft or air vehicle.

Figure 4:
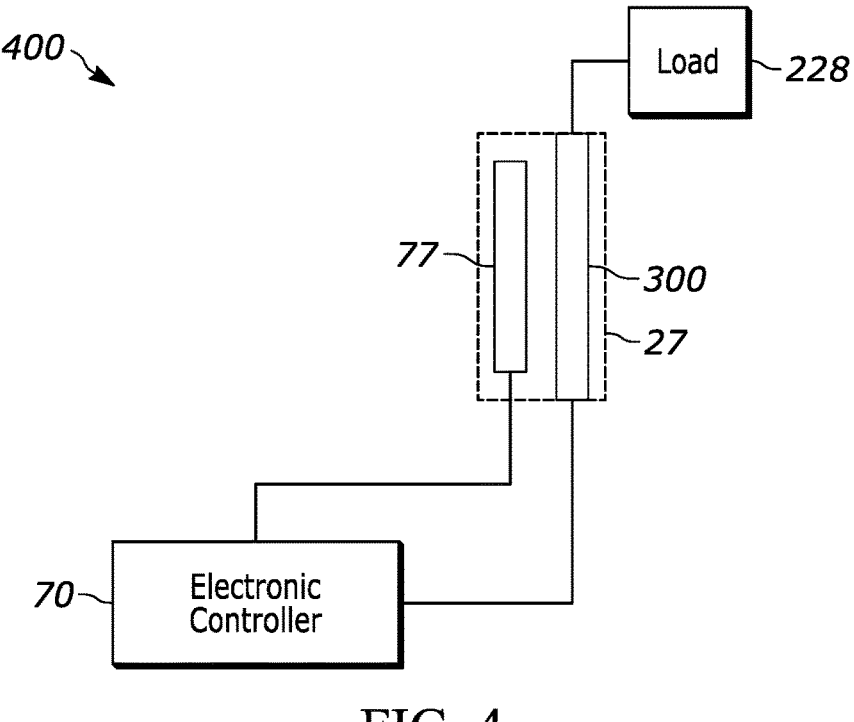
FIG. 4 depicts provides a schematic diagram of an overheating control system of the aircraft of FIG. 1.

FIG. 4 provides a schematic diagram of an overheating control system 400 in accordance with some embodiments. The system 400 includes the electronic controller 70 and the temperature sensor 77. As described above, the temperature sensor 77 is disposed within the gearbox 26 (e.g., the enclosure 27). For example, the enclosure 27 may be a portion of a housing of the gearbox 26 itself or, in some embodiments, may be a separate enclosure such as a tube or shaft housing the harness 300 within the housing the gearbox 26. In some embodiments, the temperature sensor 77 is mounted onto an inner surface of the enclosure 27. In some embodiments, the temperature sensor 77 is positioned within the harness 300 (i.e., on, between, adjacent to, or a combination thereof the plurality of wires of the bundle).

The load 402, as mentioned above, comprises one or more sub-systems (and components thereof) of the aircraft 10 that is configured to receive an adjustable (via the electronic controller 70) amount of power. For example, in some embodiments, the load 402 is or may include a de-icing system for defrosting the blades of the rotor blades 34 and/or 38 via one or more heating elements, such as one or more resistive heater mats (not shown) positioned on one or more of the rotor blades 34, 38.

The electronic controller 70 controls power provided to the load 402 through the harness 300. For example, the electronic controller 70 may be part of a power distribution control system for providing power to one or more components via one or more of a battery (not shown) and/or one or more of the motors 24.

The particular positioning of the gearbox 26 (more specifically, the enclosure 27) may make the enclosure susceptible to overheating. For example, as illustrated in FIG. 2, the enclosure 27 is disposed near the motors 24, which generate heat during operation, e.g., well above 100° C.). The harness 300 itself may also generate excess heat due to the amount of power (and duty-cycle thereof) provided through the harness 300.

For example, the harness 300 may comprise a redundant pair of heavy gauge conductors, each pair including a respective supply (e.g., 270 V DC) and ground/return wire. During normal operation, both pairs may each carry a respective portion of current to provide full power to the load 402. However, in instances where one pair of the conductors fail, the electronic controller 70 may adjust a power output supplied to the harness 300 such that the other pair carries the full current to the load 402, resulting in more excess heat generated at the functioning conductor. Such heat may cause the temperature of the harness to exceed regulation temperature limits (for example, as permitted by AS5088G or other wiring standards) and/or may cause degradation to the harness 300 itself (for example, breakdown/melting of the electrical insulation of one or more of the wires of the harness 300). It therefore may be desirable to implement an overheating control system to monitor a temperature of the harness 300 within the enclosure 27 and perform one or more operations to mitigate overheating.

Figure 5:
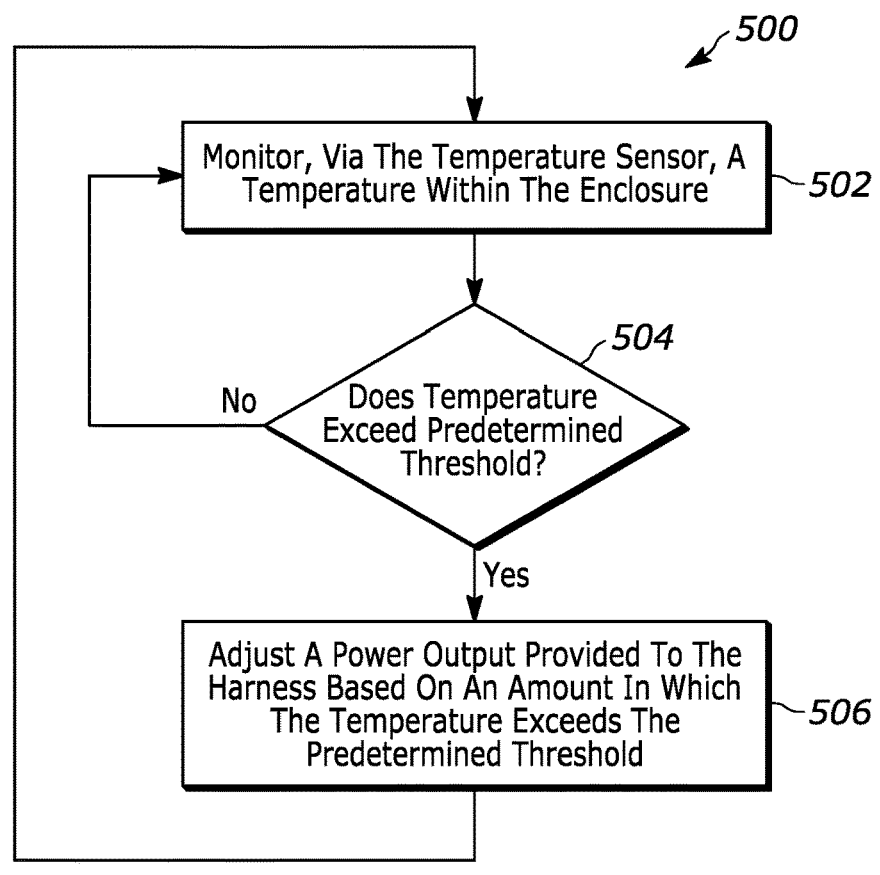
FIG. 5 depicts a method performed by the control system of FIG. 4.

Accordingly, FIG. 5 provides a method 500 for providing overheating control for the electrical power harness 300 in accordance with some embodiments. Although the method 500 is described in conjunction with the system 400 as described herein, the method 500 may be used with other systems and devices. For example, the method may alternatively or additionally be implemented with respect to an electrical harness housed within any other enclosure of the aircraft 10 (for example, an enclosure of the propeller gearbox 46). In addition, the method 500 may be modified or performed differently than the specific example provided.

For example, the method 500 is described as being performed by the electronic controller 70 and, in particular, the electronic processor 72. However, it should be understood that in some instances, portions of the method 500 may be performed by other devices. Additional electronic processors may also be included in the electronic controller 70 and/or the aircraft 10 that perform at least a portion of the method 500. For ease of description, the method 500 is described in terms of a single harness 300 within a single enclosure 27. However, the method 500 may be simultaneously applied to multiple harnesses 300 within the same or other enclosures 27.

At block 502, the electronic processor 72 monitors, via the temperature sensor 77, a temperature within the enclosure 27. The processor 72 compares the temperature to a predetermined threshold (block 504). As used herein, the measured "temperature" may refer to a single measurement from a single temperature sensor 77, an average temperature over time (or over sensors), a temperature differential derived from measurements of one or multiple temperatures sensors 77, or a combination thereof.

At block 506, the electronic processor 72 adjusts a power output provided to one or more supply lines of the harness 300 in response to the monitored temperature exceeding the predetermined threshold (block 506). The predetermined temperature threshold may be, for example, 200° C. The electronic processor 72 may adjust the power output, for example, by reducing a duty cycle of the power output provided to one or more of the supply lines of the harness 300. In some embodiments, the amount in which the power output is reduced by is proportional to the amount in which the monitored temperature exceeds the predetermined threshold. For example, in some embodiments, the more the monitored temperature exceeds the predetermined threshold, the more the electronic processor 72 adjusts (e.g., reduces) the power output. The electronic processor 72 may make such variable adjustment by determining a difference between the monitored temperature and the predetermined threshold and mapping the difference (e.g., through a mapping function, a look-up table, or the like) to a particular adjustment. In other embodiments, the electronic processor 72 may use multiple predetermined thresholds, wherein different thresholds may be associated with different adjustments. In some embodiments, the electronic processor 72 may be configured to perform one or more other operations in response to one or more predetermined thresholds being exceeded. For example, in instances where the temperature exceeds a maximum allowable operational threshold, the electronic processor 72 may stop all power to the harness 300 and/or generate an alert to a user of the aircraft 10 (for example, by activating one or more LEDs in the cockpit of the aircraft 10).

Adjusting the power output may include adjusting on and off times (e.g., duty cycles) of the load 402, which, as noted above, may include a de-icing subsystem of the aircraft. For example, the de-icing system may provide a plurality of de-icing rates (e.g., 4 different power levels) that are associated with different power usage profiles (e.g., different pulse width modulated power levels). Accordingly, using the continuous feedback loop described above for monitoring temperature, the electronic processor 72 can automatically set the de-icing subsystem to a particular rate or mode (including an off mode) based on the comparison of the monitored temperature to the predetermined threshold. Thus, the power adjustment described herein allows the de-icing subsystem to continue to be used in many situations even when one of the conductor pairs fails and, thus, provides improvements over completely turning off such subsystems in response to detecting such a failure, which does not take into account actual temperatures or the availability of different power usage levels of the de-icing subsystem. Similarly, the methods and systems described herein do not require redesign of the gearbox or components thereof or completely redundant wiring or power supply systems, which add complexity, cost, and weight to an aircraft.

It should be understood that although embodiments are described herein with respect to varying power usage of a de-icing system, the methods and systems described herein can be used to automatically adjust power usage profiles of other types of aircraft subsystems providing, for example, various avionics. For example, the methods and systems described herein may be used to automatically adjust power usage profiles of engine controls, flight control systems, navigation, communications, flight recorders, lighting systems, threat detection, fuel systems, electro-optic (EO/IR) system, weather radar, performance monitors, other mission and flight management task controllers, or a combination thereof.

Accordingly, the methods and systems described herein provide embedded thermal sensing with the gearbox of an aircraft, wherein power supply lines must pass through a limited volume through the transmission to reach the rotor blades (e.g., reach one or more resistive heat mats, lighting, sensors, etc.). Given this limited volume, the power lines may be subjected to high temperatures, especially in a wiring failure more one pair of wires carries the full power supply, and it is difficult to implement cooling or heat dissipation devices or systems in the limited space. In addition, stopping power flow through the power supply lines in response a failure in one of the wiring pairs limits usability of the de-icing or other aircraft subsystems and may limit the usability unnecessarily. Thus, by monitoring the temperature within the gearbox and this limited volume using one or more temperature sensors, a feedback loop can be created where actual temperatures are monitored and used to adaptively control power flow (e.g., by adjusting a power usage level of the de-icing system to prevent the supply wires from experiencing extreme temperatures). The addition of one or a small number of temperature sensors to the gearbox also provides a cost-efficient and weight-conscious solution to the problems described above and allows temperature information to be collected that may be used for other vehicle control systems. For example, monitoring temperatures within the gearbox may be used to establish a normal range of temperatures, which may be used to detect various operational anomalies, maintenance needs, or other events or conditions, which a pilot or other crew could be alerted to. For example, while an aircraft may include various temperature sensors, the temperature within the gearbox may represent a novel piece of information that could be fed into various control, maintenance, and flight or mission management systems.

Various features and advantages of the embodiments described herein are set forth in the following claims.

What is claimed is:

1. An aircraft comprising:
   a de-icing system configured to operate according to different power usage profiles to provide a plurality of de-icing rates that are associated with the different power usage profiles;
   an electrical power harness disposed within an enclosure of the aircraft and configured to provide power to the de-icing system; and
   a control system including a temperature sensor disposed within the enclosure and an electronic processor configured to:
      monitor, via the temperature sensor, a temperature within the enclosure;

compare the temperature to a predetermined threshold; and adaptively adjust a power output provided to one or more power supply lines of the harness by adjusting a power usage profile of the different power usage profiles of the de-icing system of the aircraft while maintaining operation of the de-icing system in response to the temperature exceeding the predetermined threshold, the adjustment of power output being proportional to an amount in which the temperature exceeds the predetermined threshold, wherein the more the monitored temperature exceeds the predetermined threshold, the more the electronic processor reduces the power output.

2. The aircraft of claim 1, wherein the enclosure is a rotor shaft of the aircraft.

3. The aircraft of claim 1, wherein the one or more power supply lines include a high-voltage power supply line.

4. The aircraft of claim 3, wherein the high-voltage power supply line is a 270 VDC line.

5. The aircraft of claim 1, wherein the temperature sensor is disposed within the electrical power harness.

6. The aircraft of claim 1, wherein the electronic processor is configured to adjust the power output by adjusting a duty cycle of the power output.

7. The system of claim 1, wherein the enclosure is a housing of a rotor gearbox.

8. The system of claim 1, wherein the enclosure is disposed within a housing of a rotor gearbox.

9. A method of controlling an electrical power harness disposed within an enclosure of an aircraft, the aircraft including a de-icing system configured to operate according to different power usage profiles to provide a plurality of de-icing rates that are associated with the different power usage profiles, electrical power harness configured to provide power to the de-icing system, the method including:

monitoring, via a temperature sensor, a temperature within the enclosure;

comparing, via an electronic processor, the temperature to a predetermined threshold; and adjusting a power output provided to one or more power supply lines of the electrical power harness by adjusting a power usage profile of the different power usage profiles of the de-icing system of the aircraft while maintaining operation of the de-icing system, the adjustment of the power output being proportional to an amount in which the temperature exceeds the predetermined threshold, wherein the more the monitored temperature exceeds the predetermined threshold, the more the electronic processor reduces the power output.

10. The method of claim 9, wherein the enclosure is a rotor shaft of the aircraft.

11. The method of claim 9, wherein the one or more power supply lines include a high-voltage power supply line.

12. The method of claim 11, wherein the high-voltage power supply line is a 270 VDC line.

13. The method of claim 9, wherein the temperature sensor is disposed within the electrical power harness.

14. The method of claim 9, wherein adjusting the power output includes adjusting a duty cycle of the power output.

15. An electronic controller installed in an aircraft including a de-icing system configured to operate according to different power usage profiles to provide a plurality of de-icing rates that are associated with the different power usage profiles, the electronic controller comprising:

an input-output interface configured to receive a signal from a temperature sensor disposed within an enclosure of the aircraft including an electrical power harness;

an electronic processor configured to:

monitor, via the signal received from the temperature sensor, a temperature within the enclosure;

compare the temperature to a predetermined threshold; and adaptively adjust a power output provided to one or more power supply lines of the harness by adjusting a power usage profile of the different power usage profiles of the de-icing system of the aircraft while maintaining operation of the de-icing system, the adjustment of the power output being proportional to an amount in which the temperature exceeds the predetermined threshold, wherein the more the monitored temperature exceeds the predetermined threshold, the more the electronic processor reduces the power output.

* * * * *